United States Patent
Kanno

(10) Patent No.: US 6,693,725 B1
(45) Date of Patent: Feb. 17, 2004

(54) MULTICOLOR IMAGE FORMING APPARATUS AND METHOD

(75) Inventor: Hiromasa Kanno, Niigata (JP)

(73) Assignee: Fuji Xerox Co., Ltd. (JP)

( * ) Notice: Subject to any disclaimer, the term of this patent is extended or adjusted under 35 U.S.C. 154(b) by 600 days.

(21) Appl. No.: 09/614,771

(22) Filed: Jul. 12, 2000

(30) Foreign Application Priority Data

Jul. 16, 1999 (JP) .......................................... 11/203454

(51) Int. Cl.[7] .............................................. G06F 15/00
(52) U.S. Cl. ...................... 358/1.9; 358/1.9; 358/409; 358/474
(58) Field of Search .................. 358/1.9, 409, 474, 358/1.1, 3.01

(56) References Cited

U.S. PATENT DOCUMENTS

| | | | |
|---|---|---|---|
| 5,610,651 A | * | 3/1997 | Yamakawa et al. ......... 347/250 |
| 5,896,158 A | * | 4/1999 | Brenner et al. ............. 347/116 |
| 6,115,572 A | * | 9/2000 | Edwards et al. ............ 399/162 |
| 6,148,168 A | * | 11/2000 | Hirai et al. ................. 399/301 |

* cited by examiner

Primary Examiner—Edward Coles
Assistant Examiner—Heather D Gibbs
(74) Attorney, Agent, or Firm—Ostrolenk, Faber, Gerb & Soffen, LLP

(57) ABSTRACT

The multicolor image forming apparatus according to the present invention comprises openings near the edge of the laser beam scanning start side, near the center, and near the edge of the laser beam scanning end side, on the photoconductor belt. The multicolor image forming apparatus measures time intervals from the horizontal synchronizing signal to the detection of the scanning start-side opening, the center opening, and the scanning end-side opening, respectively. The multicolor image forming apparatus calculates the function indicating the scanning speed at time t along the surface of the photoconductor, to correct the function indicating an image clock frequency at time t.

14 Claims, 10 Drawing Sheets

MULTICOLOR IMAGE FORMING APPARATUS AND METHOD

BACKGROUND OF THE INVENTION

1. Field of the Invention

The present invention relates to a multicolor image forming apparatus and method, and in particular, to a multicolor image forming apparatus and method that can compensate for variations in laser beam scanning speed in a multicolor image forming mechanism that scans plural laser beams on a photoconductor and superimposes formed multiple images one upon another.

2. Description of the Related Art

In conventional multicolor image forming apparatuses using plural laser beams, distances of a photoconductor to laser scanner units for respective colors vary from color to color due to an installation error or a change in temperature. These variations, in turn, cause variations in scanning speeds of laser beams scanned on the photoconductor for image formation of respective colors.

It has been proposed to correct variations in laser beam scanning speed at each scanning time or unit-to-unit variation. For example, in Japanese patent unexamined publications 63-175817, 62-253115, 03-110512 and 61-162023, a technique such as one shown in FIG. 10 is proposed, which is basically provided with two light-detecting sensors at laser beam scanning start and end sides so that deviation of detection time interval will be fed back to pixel clock frequency.

Specifically, as shown in FIG. 10, a laser beam is scanned on a photoconductor 51 with a laser scanner unit constituted of a laser diode 58, a collimator lens 56, a polygon mirror 54 and an fθ lens. Then, a scanning time is obtained by a leading end detector 52 and rear end detector 53. The scanning time is compared to a reference value by means of an operational circuit, not shown, to obtain deviation of the scanning time from the reference value, so that the oscillation frequency of an oscillator 55 from which a pixel clock is output will be controlled in accordance with the deviation.

Such a conventional technique, however, has two major drawbacks when being applied to a multicolor image forming apparatus.

The first drawback is that the mounting positions of the light-detecting sensors vary from color to color with respect to an area over which laser beams of respective colors are scanned on the photoconductor. The variations in the mounting position, in turn, cause displacement of images of respective colors formed on the photoconductor.

The second drawback is that the positions of respective laser scanner units relative to the photoconductor deviate in different angular directions from the design position due to an installation error or a change in temperature. Therefore, even if the mounting positions of the sensors for detecting scanning time of each laser beam happen to correspond with each other with respect to the area over which the laser beams of respective colors are scanned, correction of the pixel clock for each color based on the detected scanning time is not enough to scan each laser beam over the surface of the photoconductor at a constant speed. The variations in the scanning speed, in turn, causes displacement of images of respective colors.

These drawbacks make it difficult to avoid chromatic aberration in an image formed on the photoconductor.

SUMMARY OF THE INVENTION

It is an object of the present invention to provide a multicolor image forming apparatus and method that can prevent chromatic aberration caused by a deviation of difference in scanning speed among plural laser beams scanned on a photoconductor for image formation of respective colors.

In one form of the present invention, there is provided a multicolor image forming apparatus comprising a photoconductor to be driven; a plurality of laser beam scanning parts each of which scans one of a plurality of laser beams on the photoconductor in a direction substantially perpendicular to the traveling direction of the photoconductor; a multicolor image generating part for overlapping a plurality of monochromatic images of respective colors formed with the plurality of laser beams on the photoconductor to form a multicolor image; a plurality of scanning-speed measuring parts each of which measures the scanning speed of each of the plurality of laser beams scanned by each of the plurality of laser beam scanning parts along the surface of the photoconductor; image clock-frequency correcting parts each of which corrects each image clock frequency corresponding each of the plurality of laser beam scanning parts based on the measured value of the scanning speed of the laser beam scanned along the surface of the photoconductor; and a plurality of laser beam driving parts each of which drives a corresponding laser beam at the corrected image clock frequency.

According to the present invention, variations in the scanning speeds of the plurality of laser beams along the scanning surface of the photoconductor are measured to obtain a compensation value for each image clock frequency so that each of the plurality of laser beams will be driven at the corrected image clock frequency. Therefore, even if the distance of each laser scanner unit relative to the photoconductor varies due to an installation error or change in temperature, a latent image of desired image data can be formed in a desired position on the photoconductor. That is, the image formed by scanning the laser beams of respective colors and developed by each developing unit will be of high quality without color aberration.

BRIEF DESCRIPTION OF THE DRAWINGS

By way of example and to make the description more clear, reference is made to the accompanying drawings, in which.

DETAILED DESCRIPTION OF THE PREFERRED EMBODIMENT

Embodiments of the present invention will be described in detail with reference to the drawings.

Figure 1:
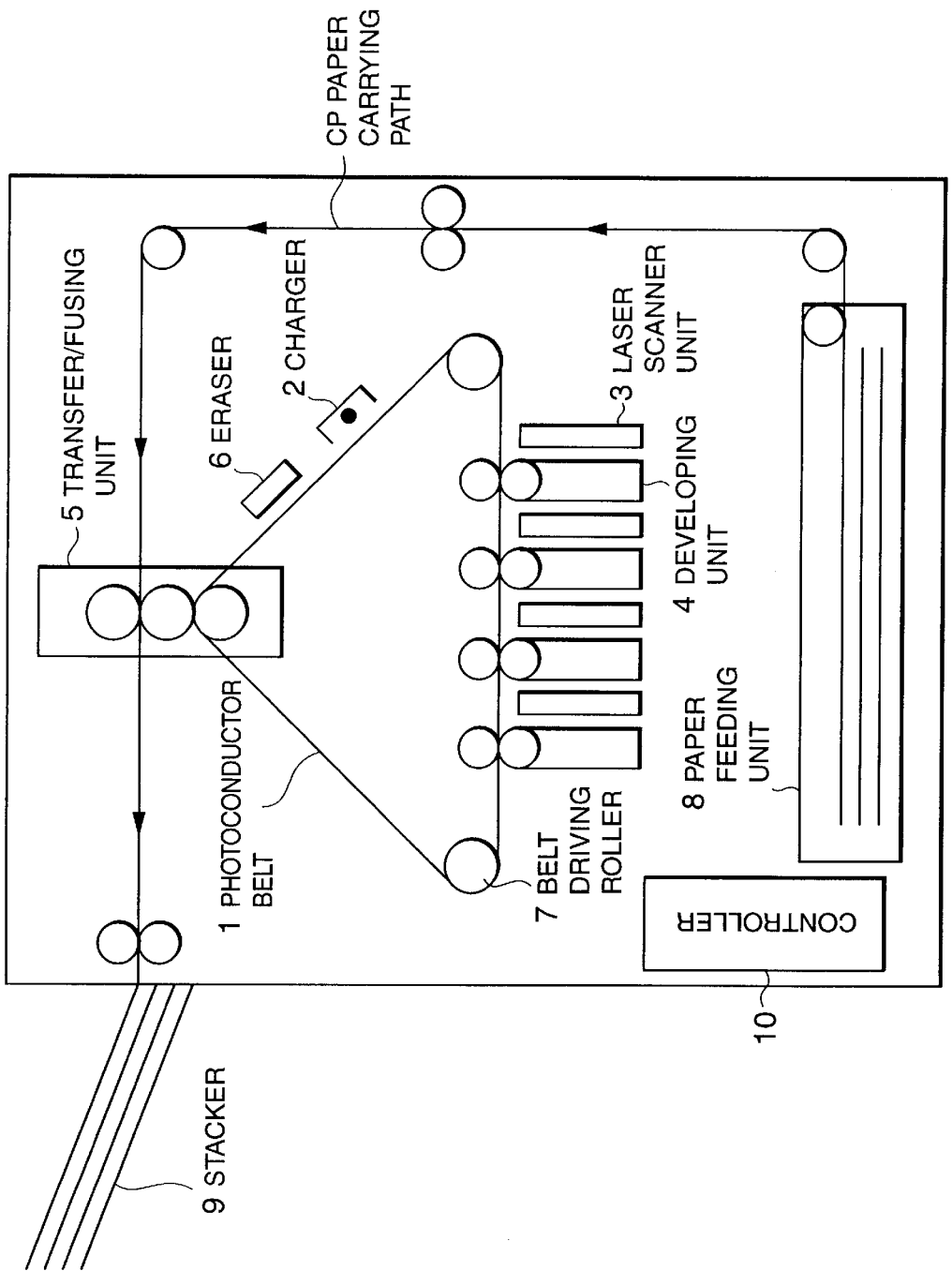
FIG. 1 is a block diagram showing the general structure of a first embodiment of the present invention.

FIG. 1 is a block diagram showing the general structure of the first embodiment.

Although multicolor image forming apparatuses of the type that overlaps images formed by a plurality of laser beams are used in copying machines, facsimiles, printers and the like, FIG. 1 shows a case where the present invention is embodied in a printer.

A photoconductor belt 1 is a belt-shaped photoconductor which has the circumference longer than a length of a page of a printable maximum image.

Belt rollers 7 are rotated by a motor, not shown, to drive the photoconductor belt 1 such that a charger 2, laser scanner units 3, developing units 4, a transfer/fusing unit 5, and an eraser 6 pass through the surface of the photoconductor belt 1 in this order.

The charger 2 charges the surface of the photoconductor belt 1.

Each laser scanner unit 3 irradiates a laser beam while turning on and off a laser diode emitting the laser beam. Thus, the laser scanner unit 3 performs scanning on the photoconductor belt 1 to form a latent image of desired image data on the photoconductor belt 1.

Each developing unit 4 develops the latent image to form a toner image on the photoconductor belt 1.

The transfer/fusing unit 5 transfers to and fuses on a paper all the toner images carried on the photoconductor belt 1.

The eraser 6 eliminates static electricity from the surface of the photoconductor belt 1 after the completion of image transfer.

A paper feeding unit 8 feeds papers to a paper carrying path CP.

The paper carrying path CP carries papers fed from the paper feeding unit 8 so that the papers will be ejected from a stacker 9 via the transfer/fusing unit 5. A controller 10 controls each unit.

Four sets of the laser scanner units 3 and the developing units 4 are provided and disposed in the driving direction of the photoconductor belt 1. Each set is to form on the photoconductor belt 1 a toner image of any one of four colors, cyan, magenta, yellow, or black. These toner images are overlapped one upon another to form a full-color image. It should be noted that the number of sets is not limited to four. For example, the color combination may be two sets of magenta and black, or three sets of yellow, magenta and cyan.

Figure 4:
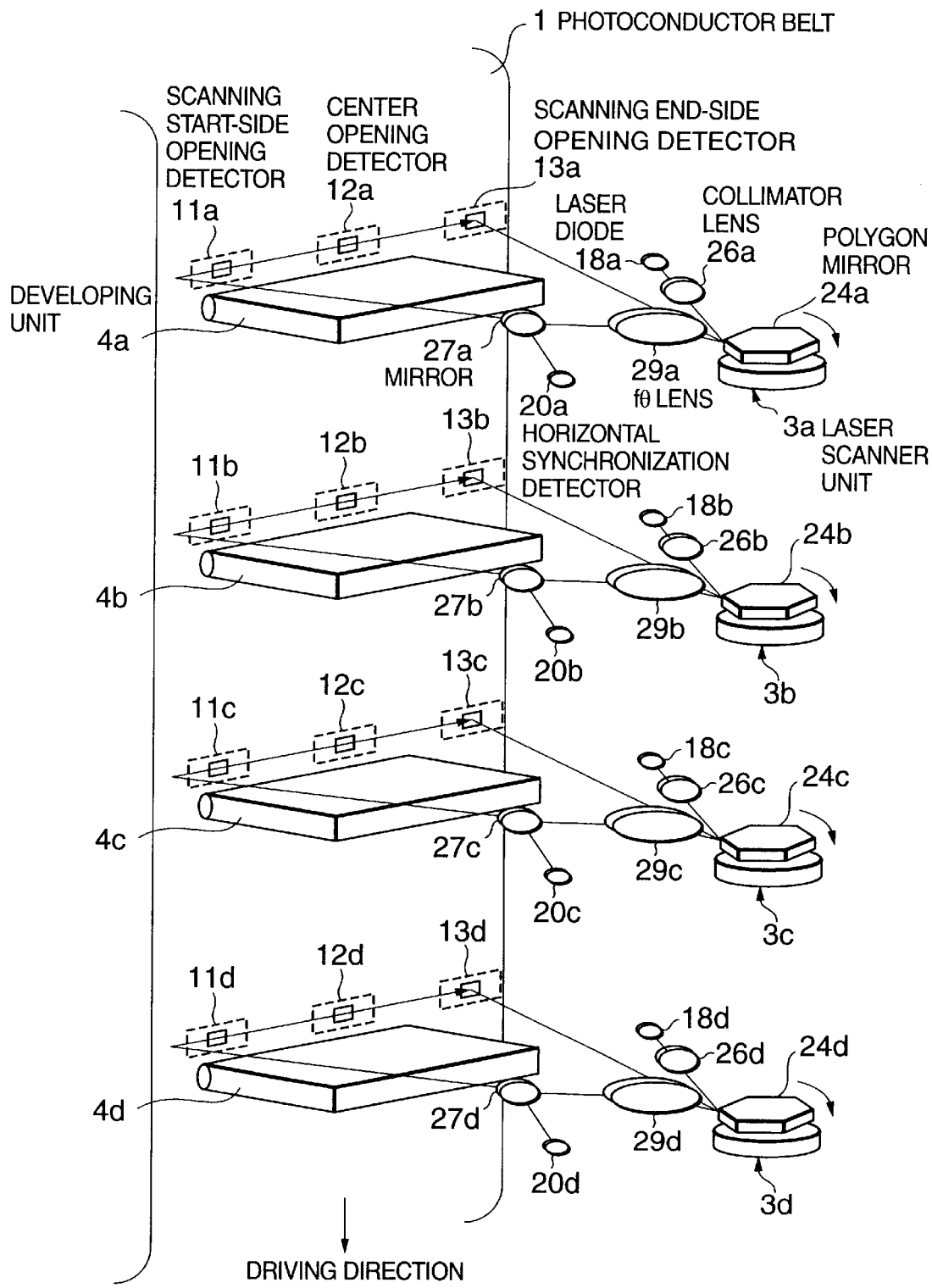
FIG. 4 is a perspective view showing the arrangement of laser scanner units and corresponding detectors.

Referring next to FIG. 4, the following describes the arrangement of the photoconductor belt 1, four-color laser scanner units 3a–3d, scanning start-side opening detectors 11a–11d, center opening detectors 12a–12d, scanning end-side opening detectors 13a–13d, and developing units 4a–4d. FIG. 4 is a perspective view showing the arrangement of the laser scanner units and the related detectors.

The photoconductor belt 1 is made of material that prevents transmission of laser beams except for the openings.

The photoconductor belt 1 is driven by the belt driving rollers (reference number 7 in FIG. 1), while the laser beams are scanned in a direction perpendicular to the traveling direction of the photoconductor belt 1.

The laser beams scanned on the photoconductor belt 1 forms latent images, which are then developed by the developing units 4a–4d one by one.

The laser scanner units 3a–3d of respective colors are provided with laser diodes 18a–18d, collimator lenses 26a–26d, polygon mirrors 24a–24d, fθ lenses 29a–29d, mirrors 27a–27d, and horizontal synchronization detectors 20a–20d. These elements are fixed in the same type of case for each color unit.

The laser beam from the laser diode 18a–18d for each color passes through the collimator lens 2a–26d for each color to be a collimated or parallel light beam. The collimated light beam is reflected by the rotary polygon mirror 24a–24d provided for each color and scanned on the photoconductor belt 1 through the fθ lens 29a–29d. The laser beam from the laser diode 18a–18d for each color is also reflected by the mirror 27a–27d just before scanning on the photoconductor belt 1 is started, so that the reflected laser beam is incident on the horizontal synchronization detector 20a–20d.

Figure 3:
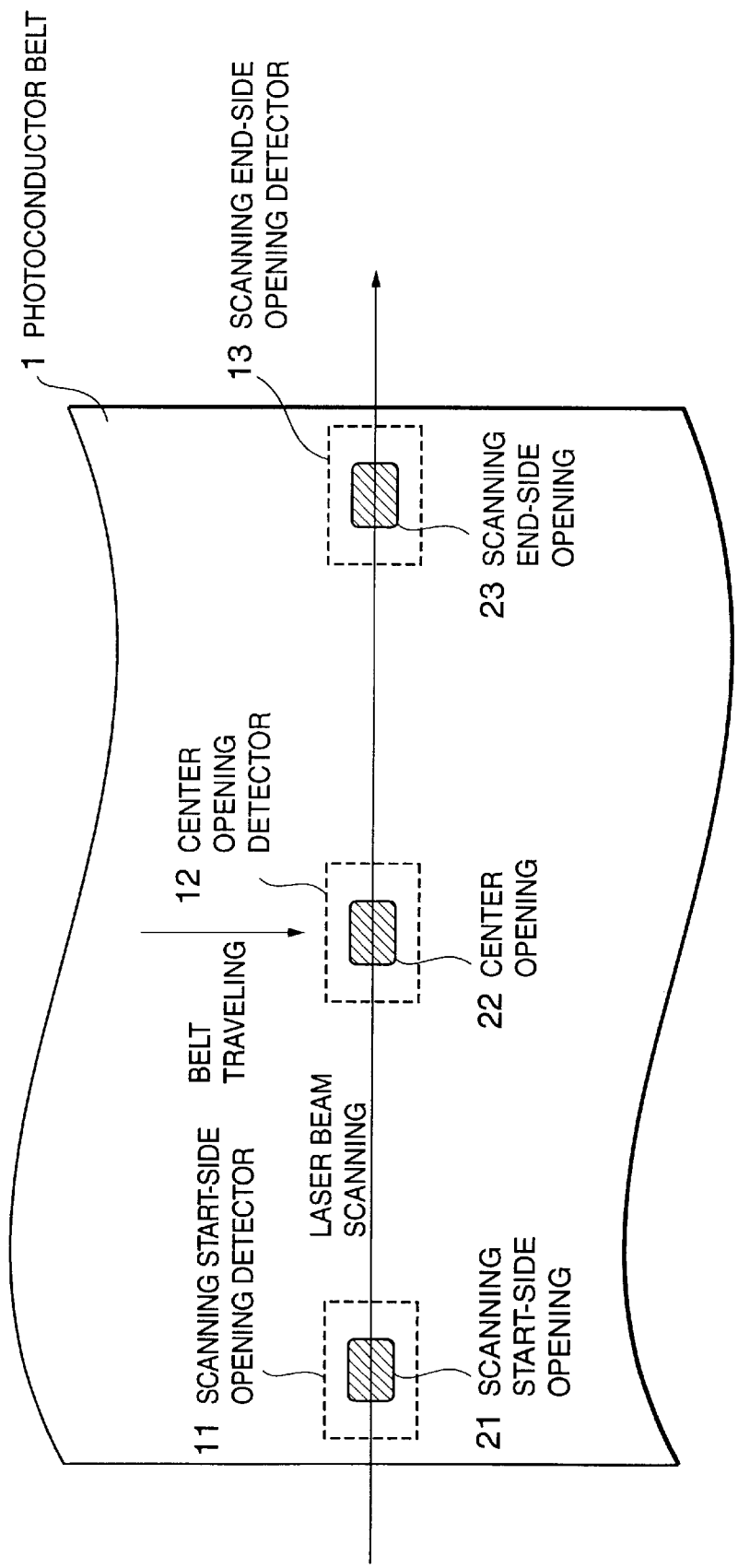
FIG. 3 is a plan view showing the arrangement of openings on a photoconductor belt and related opening detectors.

Referring next to FIG. 3, the position of each opening formed on the photoconductor belt 1 and each detector will be described in more detail. FIG. 3 is a plan view showing the arrangement of openings and opening detectors on the photoconductor belt 1 when the openings travel to a position in which one laser beam is to be scanned.

A scanning start-side opening 21 is formed on the photoconductor belt 1 near the scanning start point in the laser beam scanning direction, i.e., near the edge of the scanning start side in a range of laser beam irradiation. As seen from the incident direction of the laser beam, the scanning start-side opening detector 11 is located behind the photoconductor belt 1 and so positioned that the laser beam passes through the scanning start-side opening 21 to the scanning start-side opening detector 11.

A center opening 22 is formed on the photoconductor belt 1 near the center of the photoconductor belt 1 in the scanning direction, where the laser beam is incident from a direction substantially perpendicular to the surface of the photoconductor belt 1. As seen from the incident direction of the laser beam, the center opening detector 12 is located behind the photoconductor belt 1 and so positioned that the laser beam passes through the center opening 22 to the center opening detector 12.

A scanning end-side opening 23 is formed on the photoconductor belt 1 near the scanning end point in the laser beam scanning direction, i.e., near the edge of the scanning end side in a range of laser beam irradiation. As seen from the incident direction of the laser beam, the scanning end-side opening detector 13 is located behind the photoconductor belt 1 and so positioned that the laser beam passes through the scanning end-side opening 23 to the scanning end-side opening detector 13.

These detectors 11, 12 and 13 have a light-receiving area much lager than the area of each opening on the photoconductor belt 1.

It should be noted that a set of the scanning start-side openings 21, a set of the center openings 22, and a set of the scanning end-side openings 23 are provided in about the same position along the traveling direction of the photoconductor belt. Further, these openings are provided outside the area in which toner images are formed.

Figure 5:
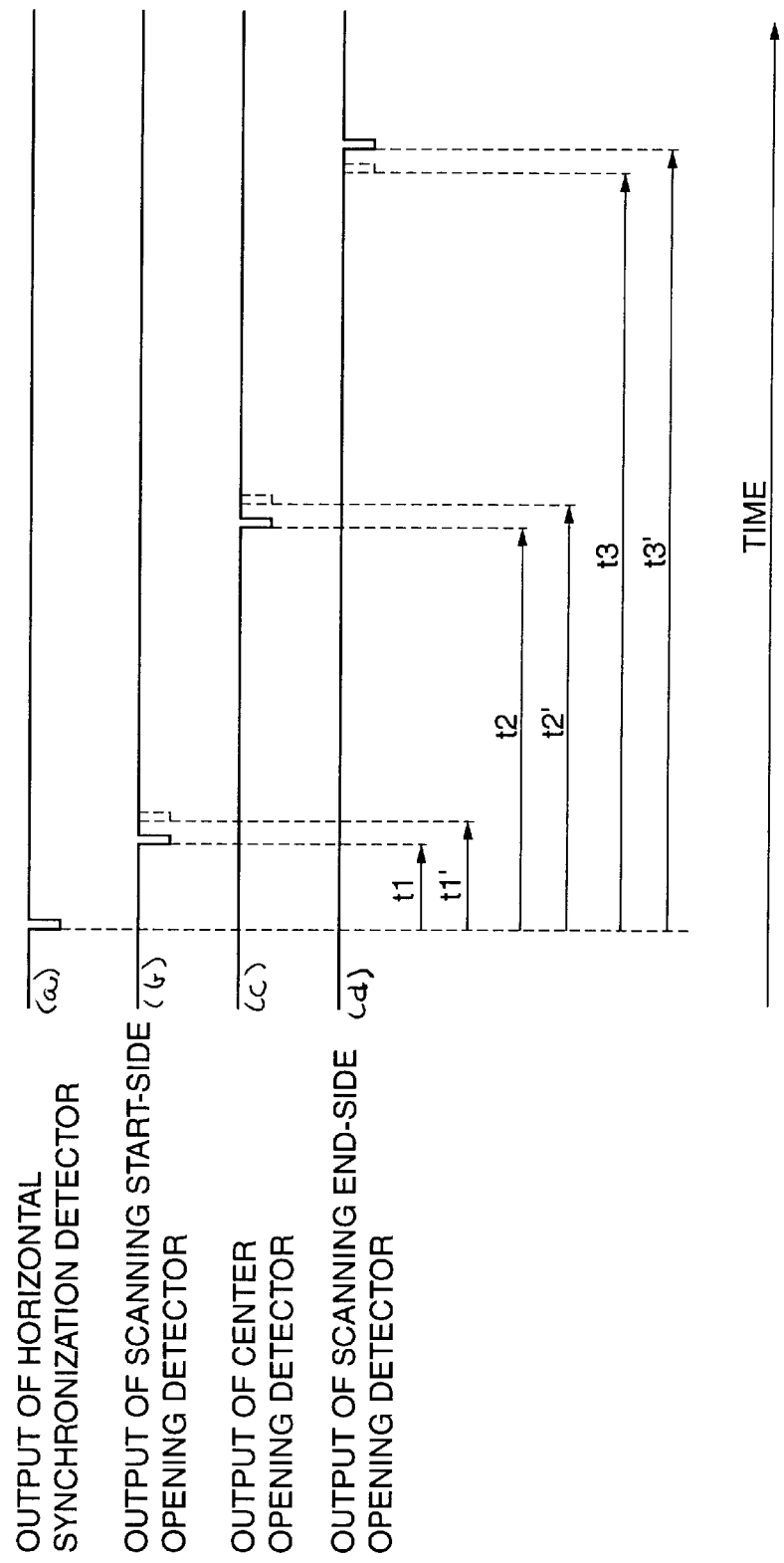
FIG. 5 is a timing chart showing output timing of each detector.

FIG. 5 is a timing chart showing output timing of each detector.

The "(a)" waveform of FIG. 5 shows the waveform of a horizontal synchronizing signal pulse that is output from the horizontal synchronization detector 20a–20d of FIG. 4 upon detection of the start of laser beam scanning. The "(b)" waveform of FIG. 5 shows the waveform of a scanning start-side opening detection pulse that is output from the scanning start-side opening detector 11a–11d of FIG. 4 upon detection of the scanning start-side opening 21. The "(c)" waveform of FIG. 5 shows the waveform of a center opening detection pulse that is output from the center opening detector 12a–12d upon detection of the center opening 22. The "(d)" waveform of FIG. 5 shows the waveform of a scanning end-side opening detector 13a–13d upon detection of the scanning end-side opening 23.

If the photoconductor belt 1 is put in an ideal position, i.e., if it is positioned as intended in design, the scanning start-side opening detection pulse is output from the scanning start-side opening detector 11 when time t1 has elapsed after the horizontal synchronizing signal pulse was output. Then, the center opening detection pulse is output from the center opening detector 12 when time $t_2$ has elapsed after the horizontal synchronizing signal pulse was output. Further, the scanning end-side opening detection pulse is output from the scanning end-side opening detector 13 when time $t_3$ has elapsed after the horizontal synchronizing signal pulse was output. On the other hand, if the actual position of the photoconductor belt 1 deviates from that in design, the scanning start-side opening detection pulse is output from the scanning start-side opening detector 11 when time $t_1'$, unequal to time $t_1$, has elapsed after the horizontal synchronizing signal pulse was output. Then, the center opening detection pulse is output from the center opening detector 12 when time $t_2'$, unequal to time $t_2$, has elapsed after the horizontal synchronizing signal pulse was output. Further, the scanning end-side opening detection pulse is output from the scanning end-side opening detector 13 when time $t_3'$, unequal to time $t_3$, has elapsed after the horizontal synchronizing signal pulse was output.

Figure 6:
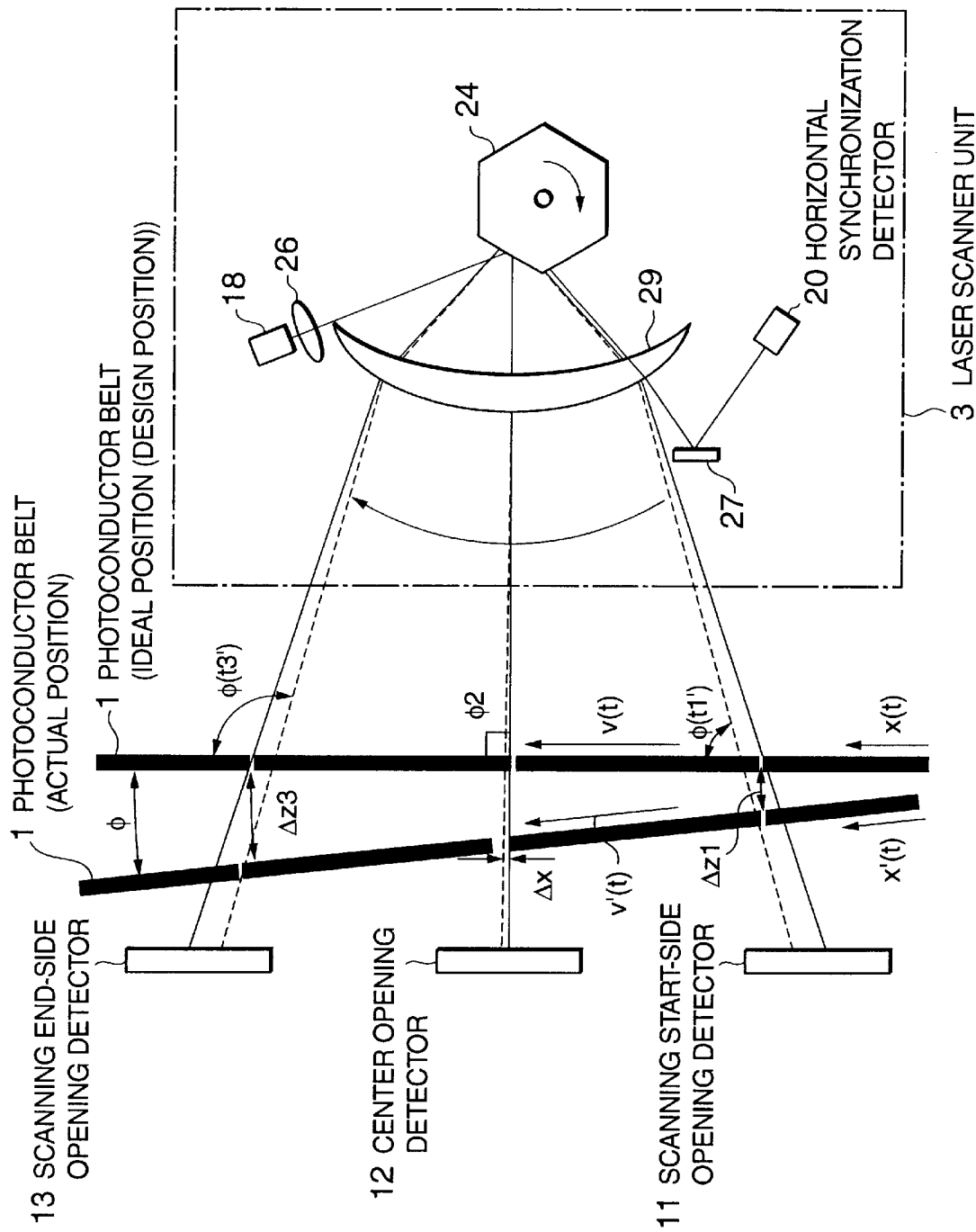
FIG. 6 is a diagram for explaining errors caused by positional deviations of the photoconductor belt.

FIG. 6 is a diagram for explaining errors in pulse detection time at the respective openings caused by positional deviations of the photoconductor belt 1.

If the photoconductor belt 1 is put in an ideal position relative to the laser scanner unit 3, the laser beam scanning position on the photoconductor belt 1 is represented as a function x(t) of time t, where t=0 at the time of occurrence of the horizontal synchronizing signal. The scanning speed of the laser beam scanned along the photoconductor belt 1 at time t is represented as a function v(t). The incident angle of the laser beam to the photoconductor belt 1 at time t is represented as a function φ(t). The function φ(t) becomes the minimum value at the scanning start side, about 90 deg. at the center, and the maximum value at the scanning end side.

The functions x(t) and v(t) have the following relation:

$$x(t) = \int_0^t v(t)dt \qquad (3)$$

On the other hand, the actual laser beam scanning position on the photoconductor belt 1 is represented as a function x'(t) of time t in one scanning operation of the laser beam, where t=0 at the time of occurrence of the horizontal synchronizing signal. The actual scanning speed of the laser beam scanned along the photoconductor belt 1 at time t is represented as a function v'(t).

Suppose that the actual position of the photoconductor belt 1 deviates from the ideal position relative to the laser scanner unit 3. The relative position of the center opening 22 is supposed to deviate from the ideal position of the photoconductor belt 1 relative to each scanner unit 3, i.e., from that in design. For example, it deviates by an amount Δx of deviation on the scanning end side along the laser beam scanning direction (hereinafter, called the scanning direction). The relative position of the scanning start-side opening 21 is presumed to deviate from the ideal position of the photoconductor belt 1 relative to each scanner unit 3. For example, it deviates by an amount $\Delta z_1$ of deviation in a direction along the laser beam optical axis at the center position in the scanning direction(hereinafter, called the center optical axis direction) to draw apart from the scanner unit 3. The relative position of the scanning end-side opening 23 is presumed to deviate from the ideal position of the photoconductor belt 1 relative to each scanner unit 3. For example, it deviates by an amount $\Delta z_3$ of deviation in a center optical axis direction to draw apart from the scanner unit 3. Further, the surface of the photoconductor belt 1 is presumed to tilt an angle ψ with respect to the photoconductor belt 1 the position of which is ideal relative to the laser scanner unit 3.

If the relative position of the photoconductor belt 1 is ideal, i.e., if it is put in a position as intended in design, the scanning position $x(t_1)$ of the laser beam on the photoconductor belt 1 corresponds with that of the scanning start-side opening 21 when $t_1$, has elapsed after the horizontal synchronizing signal pulse was output. At this time, the laser beam passes through the scanning start-side opening 21 and the scanning start-side opening detection pulse is output from the scanning start-side opening detector 11. On the other hand, the actual scanning position $x'(t_1)$ of the laser beam on the photoconductor belt 1 has not reached the scanning start-side opening 21 yet for the following reasons: The incident angle of the laser beam is smaller than 90 deg. at the scanning start side; the relative position of the center opening 22 deviates by the deviation amount Δx on the scanning end side; and the relative position of the scanning start-side opening 21 deviates by the deviation amount $\Delta z_1$ in a center optical axis direction to draw apart from the laser scanner unit 3. The scanning position $x'(t_1')$ of the laser beam on the photoconductor belt 1 corresponds with that of the scanning start-side opening 21 when $t_1'$ has elapsed after the horizontal synchronizing signal pulse was output. At this time, the laser beam passes through the scanning start-side opening 21 and the scanning start-side opening detection pulse is output from the scanning start-side opening detector 11.

Also, if the photoconductor belt 1 is positioned as intended in design, the scanning position $x(t_2)$ of the laser beam on the photoconductor belt 1 corresponds with that of the center opening 22 when $t_2$ has elapsed after the horizontal synchronizing signal pulse was output. On the other hand, the actual scanning position $x'(t_2)$ of the laser beam on the photoconductor belt 1 has not reached the center opening 22 yet because the relative position of the center opening 22 deviates by the deviation amount Δx on the scanning end side. The scanning position $x'(t_2')$ of the laser beam on the photoconductor belt 1 corresponds with that of the center opening 22 when $t_2'$ has elapsed after the horizontal synchronizing signal pulse was output. At this time, the laser beam passes through the center opening 22 and the center opening detection pulse is output from the center opening detector 12.

Further, if the photoconductor belt 1 is positioned as intended in design, the scanning position $x(t_3)$ of the laser beam on the photoconductor belt 1 corresponds with that of the scanning end-side opening 23 when $t_3$ has elapsed after the horizontal synchronizing signal pulse was output. On the other hand, the actual scanning position $x'(t_3)$ of the laser beam on the photoconductor belt 1 has already passed by the scanning end-side opening 23, though the relative position of the center opening 22 deviates by the deviation amount Δx on the scanning end side. This happens because the incident angle of the laser beam is larger than 90 deg. at the scanning end side, and the relative position of the scanning end-side opening 23 deviates by the deviation amount $\Delta z_3$ in a center optical axis direction to draw apart from the laser scanner unit 3. As a result, the scanning end-side opening detection pulse is output from the scanning end-side opening detector 13 when time $t_3'$ shorter than time $t_3$ has elapsed after the horizontal synchronizing signal pulse was output.

Figure 2:
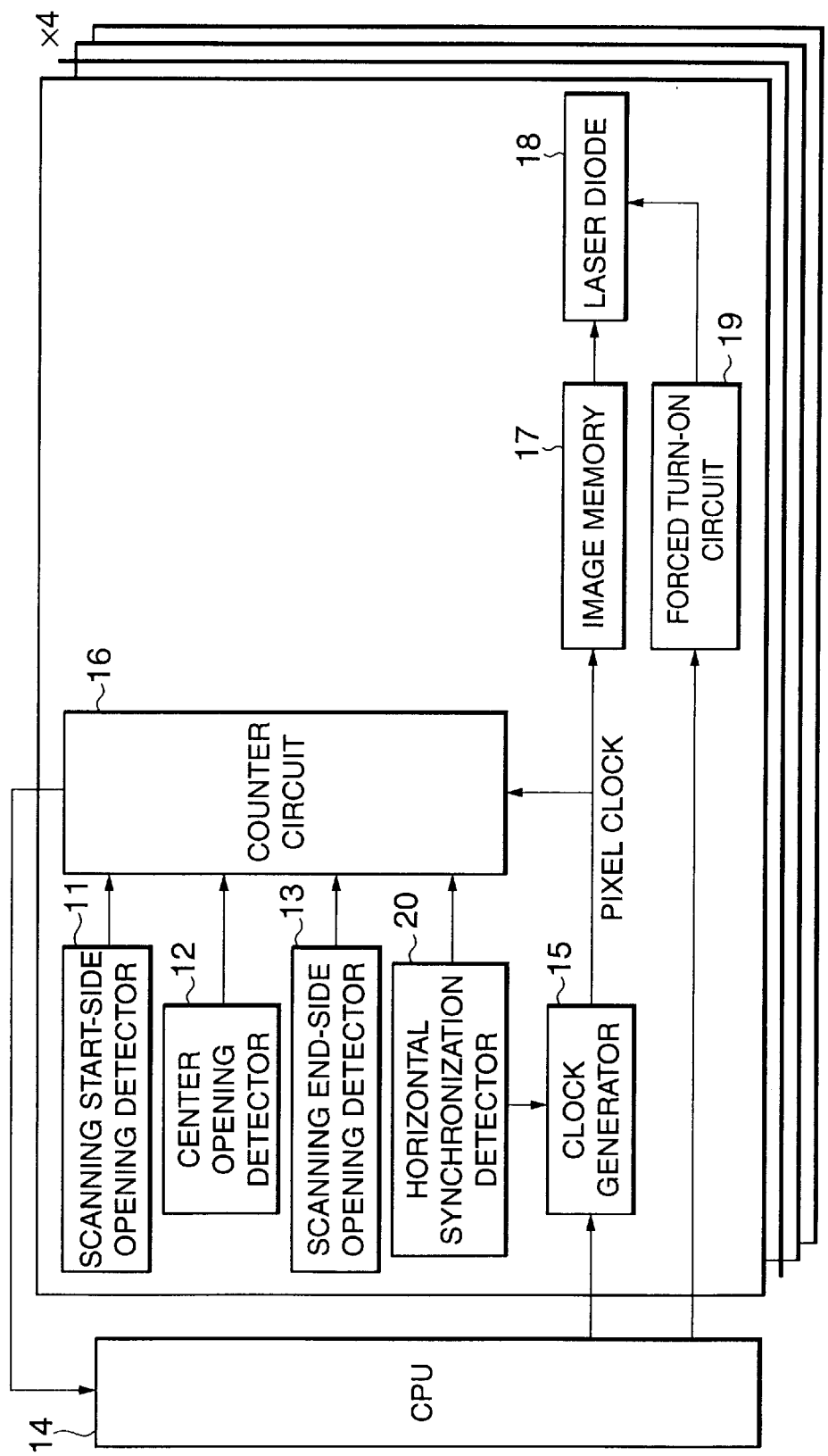
FIG. 2 is a block diagram showing a configuration of a system for correcting the scanning speed of each laser beam.

FIG. 2 is a block diagram showing a configuration of a system for correcting the scanning speed of each laser beam.

The controller (reference number 10 in FIG. 1) includes a CPU (central processing unit) 14, a clock generator 15, a counter circuit 16, an image memory 17, and a forced turn-on circuit 19.

As mentioned above, the scanning start-side opening detector 11 detects the scanning start-side opening 21, provided near the scanning start point in the scanning direction of the laser beam on the photoconductor belt 1, to output the scanning start-side opening detection pulse.

The center opening detector 12 detects the center opening 22, provided near the center of the photoconductor belt 1 in the scanning direction, where the laser beam is incident from a direction substantially perpendicular to the surface of the photoconductor belt 1, to output the center opening detection pulse.

The scanning end-side opening detector 13 detects the scanning end-side opening 23, provided near the scanning end point in the scanning direction of the laser beam on the photoconductor belt 1, to output the scanning end-side opening detection pulse.

The horizontal synchronization detector 20 is provided inside the laser scanner unit 3; it detects the start of laser beam scanning to output the horizontal synchronizing signal pulse.

The CPU 14 stores in its memory part, not shown, the following functions for a case where the photoconductor belt 1 is put in the ideal position relative to the laser scanner unit 3: the function $x(t)$ indicative of the scanning position of the laser beam; the function $v(t)$ indicative of the scanning speed of the laser beam along the photoconductor belt 1 at time t; and the function $\phi(t)$ indicative of the incident angle of the laser beam to the photoconductor belt 1 at time t. The CPU 14 also stores, in its memory part, not shown, time intervals between pulses for the case where the photoconductor belt 1 is put in the ideal position relative to the laser scanner unit 3. The time intervals include time $t_1$, between the horizontal synchronizing signal pulse and the scanning start-side opening detection pulse, time $t_2$ between the horizontal synchronizing signal pulse and the center opening detection pulse, and time $t_3$ between the horizontal synchronizing signal pulse and the scanning end-side opening detection pulse. Further, the CPU 14 stores in its memory part, not shown, a reference clock for use as a reference in time measurement executed by the counter circuit 16, and a clock defining function $f(t)$ that defines a pixel clock frequency for use in transferring image data at time t for the case where the photoconductor belt 1 is put in the ideal position relative to the laser scanner unit 3. The clock defining function $f(t)$ may be stored in the form of a table on which time 1 is divided into time frames each of which has a corresponding clock frequency.

The counter circuit 16 measures actual time intervals between pulses. The actual time intervals include time $t_1'$ between the horizontal synchronizing signal pulse and the scanning start-side opening detection pulse, time $t_2'$ between the horizontal synchronizing signal pulse and the center opening detection pulse, and time $t_3'$ between the horizontal synchronizing signal pulse and the scanning end-side opening detection pulse.

The clock generator 15 outputs a reference clock for use as reference in measuring the length of time at the counter circuit 16 based on settings from the CPU 14. The CPU 14 compares $t_1'$, $t_2'$ and $t_3'$ with the defined values $t_1$, $t_2$ and $t_3$, and corrects the clock defining function $f(t)$ by making computations with the functions $x(t)$, $v(t)$ and $\phi(t)$ to determine a clock defining function $f'(t)$ indicative of a frequency to be output as a pixel clock for use in transferring image data at time t. The clock defining function $f'(t)$ is set in the clock generator 15.

The clock defining function $f'(t)$ may be stored in the form of a table on which time t is divided into plural time frames each of which has a corresponding clock frequency, or the CPU 14 may give the clock generator 15 such instructions as to specify each time frame and each clock frequency corresponding to the time frame.

Then the clock generator 15 outputs a pixel clock for use in transferring image data based on the settings from the CPU 14.

The image memory 17 outputs the image data to the laser diode 18 in synchronization with the pixel clock output from the clock generator 15. The laser diode 18 is driven based on the image data to form a latent image of the image data on the photoconductor belt 1.

Of all the above-mentioned elements, the scanning start-side opening detector 11, the center opening detector 12, the scanning end-side opening detector 13, the horizontal synchronization detector 20, the clock generator 15, the counter circuit 16, the image data 17 and the laser diode 18 are provided for each color.

In FIGS. 3 and 4, the width of the photoconductor belt 1 is wider than the range of laser beam irradiation. Also, the scanning start-side opening 21 is formed on the photoconductor belt 1 near the scanning start point in the laser beam scanning direction, and the scanning end-side opening 23 is formed on the photoconductor belt 1 near the scanning end point in the laser beam scanning direction. However, if the width of the photoconductor belt 1 is narrower than the range of laser beam irradiation, the scanning start-side opening 21 and the scanning end-side opening 23 may be eliminated. The configuration may be such that the scanning start-side opening detector 11 and the scanning end-side opening detector 13 are partially covered with the edges of the photoconductor belt 1 on the scanning start and end sides, respectively.

In this case, the counter circuit 16 measures three time intervals between pulses. The first one is an interval between the horizontal synchronizing signal pulse and a signal from the scanning start-side opening detector 11 that indicates the edge of the scanning start side on the photoconductor belt 1. The second one is an interval between the horizontal synchronizing signal pulse and the center opening detection pulse. The third one is an interval between the horizontal synchronizing signal pulse and a signal from the scanning end-side opening detector 13 that indicates the edge of the scanning end side on the photoconductor belt 1.

Figure 7:
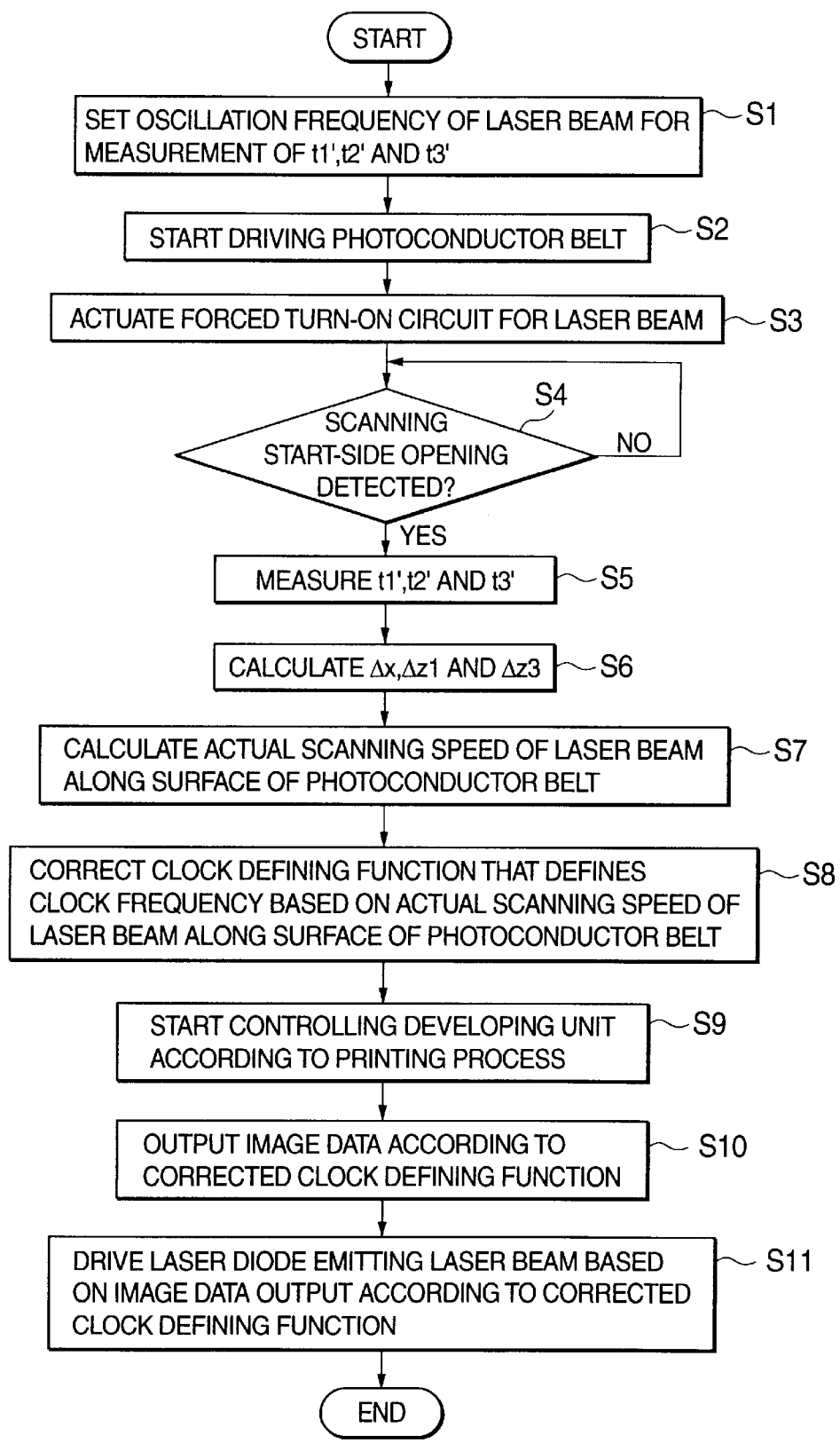
FIG. 7 is a flowchart showing the process to correct a clock defining function executed by a controller 10 of FIG. 1.
Figure 8:
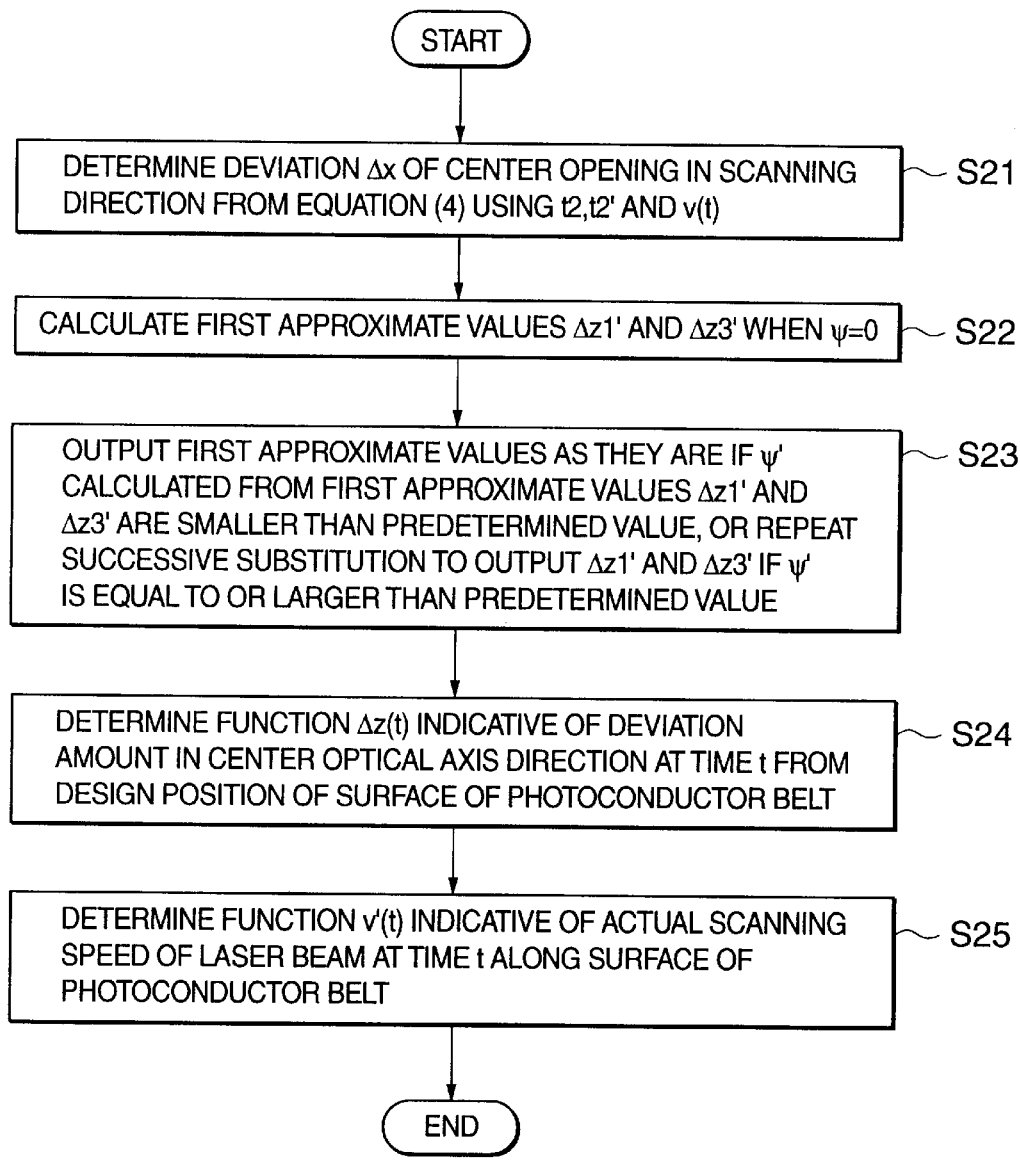
FIG. 8 is a flowchart showing the process to calculate the clock defining function carried out in step S6 to step S8 of FIG. 7.

Next, the operation will be described. FIG. 7 is a flowchart showing the process to correct the clock defining function executed by the controller 10.

First, the following describes the process to determine the scanning speed function $v'(t)$ for each color of laser beam scanned along the surface of the photoconductor belt 1 at time t.

The CPU 14 sets in the clock generator 15 each time interval between the horizontal synchronizing signal pulse and the scanning start-side opening detection pulse, the center opening detection pulse, or the scanning end-side opening detection pulse (step S1).

Then, the CPU 14 starts driving the photoconductor belt 1 (step S2), and actuates the forced turn-on circuit 19 to forcibly turn on the laser diode 18 (step S3).

It is next determined whether the scanning start-side opening detector 11 corresponding to the laser diode 18 forcibly turned on detects an output of the scanning start-side opening detection pulse (step S4). If it detects no output, the step S4 is repeated until it detects the output. If it detects the output, the counter circuit 16 measures $t_1'$, $t_2'$ and $t_3'$ (Step S5). Time $t_1'$ is a time interval between the horizontal synchronizing signal pulse and the scanning start-side opening detection pulse. Time $t_2'$ is a time interval between the horizontal synchronizing signal pulse and the center opening detection pulse output from the center opening detector 12. Time $t_3'$ is a time interval between the horizontal synchronizing signal pulse and the scanning end-side opening detection pulse output from the scanning end-side opening detector 13. It should be noted that the CPU 14 might stop the actuation of the forced turn-on circuit 19 after the completion of the measurement.

The CPU 14 compares the values $t_1'$, $t_2'$ and $t_3'$ for each color, measured by the counter circuit 16, with the values $t_1$, $t_2$ and $t_3$ for each color, stored in the CPU 14. Then, it makes computations with the functions $x(t)$, $v(t)$ and $\phi(t)$ to determine a deviation amount $\Delta x$ of the center opening 22 in the scanning direction, a deviation amount $\Delta z_1$, of the scanning start-side opening 21 in the center optical axis direction, and a deviation amount $\Delta z_3$ of the scanning end-side opening 23 in the center optical axis direction (step S6).

Further, the CPU 14 determines a function $v'(t)$ indicative of the actual scanning speed of each color of laser beam on the photoconductor belt 1 the position of which deviates from the ideal position, from the deviation amount $\Delta x$ of the center opening 22 in the scanning direction, the deviation amount $\Delta z_1$, of the scanning start-side opening 21 in the center optical axis direction, the deviation amount $\Delta z_3$ of the scanning end-side opening 23 in the center optical axis direction, and the function $v(t)$ indicative of the scanning speed of the laser beam on the photoconductor belt 1 the position of which is supposed to be ideal (step S7). The above-mentioned processing steps are performed for each color.

Then, the operating procedure goes to the printing process. Using the clock defining function $f(t)$ that defines the clock frequency at time t for the case where the photoconductor belt 1 is put in the ideal position, the function $v(t)$ indicative of the scanning speed of the laser beam on the photoconductor belt 1 the position of which is supposed to be ideal, and the function $v'(t)$ indicative of the scanning speed of each color of laser beam on the photoconductor belt 1 the position of which deviates from the ideal position, the CPU 14 calculates from equation (1) a clock defining function $f'(t)$ that defines a clock frequency at time t based on the deviation amount of the photoconductor belt 1. Then, the CPU 14 sets in the clock generator 15 the value of clock frequency at each time t (step S8).

$$f'(t)=f(t)\cdot v'(t)/v(t) \quad (1)$$

Then, the CPU 14 starts driving the photoconductor belt 1 while controlling the developing units 4a–4d to operate according to the printing process (step S9).

In the printing process, the clock generator 15 outputs clock frequencies varied based on the clock defining function $f'(t)$ determined for each time t, while the image memory outputs image data in response to output of each pixel clock (step S10).

The laser diode 18 is driven based on the data to form latent images on the photoconductor belt 1 (step S11). The latent images are developed one by one by the developing units 4a–4d.

Distance P between recording pixels in the horizontal scanning direction is represented as the product of the laser beam scanning speed multiplied by the pixel clock period. Therefore, from equation (1), equation (2) is given:

$$P=v(t)/f(t)=v'(t)/f'(t) \quad (2)$$

Equation (2) denotes that the distance P between recording pixels in the horizontal scanning direction is always constant even if the position of the photoconductor belt 1 deviates. It is apparent from equation (2) that latent images of desired image data can be formed on the photoconductor belt 1 at all times.

The above-mentioned operations are performed for each color. The distance between the photoconductor belt 1 and each laser scanner unit 3 varies from color to color due to an installation error or a change in temperature. However, even if laser beams of respective colors differ in scanning speed from each other due to variation in the distance, latent images of desired image data can be formed precisely on the photoconductor belt 1.

Next, the following describes the processing steps S6 to S8 in more detail, i.e., how to calculate the clock defining function $f'(t)$ that defines, based on the measured values $t_1'$, $t_2'$ and $t_3'$, pixel clocks for use in transferring image data.

First, using the values $t_2$, $t_2'$ and the predetermined function $v(t)$, the deviation amount $\Delta x$ of the center opening 22 in the scanning direction is obtained from equation (4) (step S21)

$$\Delta x = x(t'_2) - x(t_2) = \int_{t_2}^{t'_2} v(t)dt \quad (4)$$

In the center of the photoconductor belt 1, the laser beam is generally irradiated onto the photoconductor belt 1 from a direction substantially perpendicular to the surface of the photoconductor belt 1. Therefore, even if the position of the photoconductor belt 1 deviates, the deviation amount $\Delta x$ can be represented as the difference between the laser beam scanning position $x(t_2')$ on the photoconductor belt 1 at time $t_2'$ and the laser beam scanning position $x(t_2)$ on the photoconductor belt 1 at time $t_2$. Thus, the deviation amount $\Delta x$ can be calculated from equation (4).

Next, using the values $x(t_1)$, $x(t_2)$, $x(t_3)$, $t_1'$, $t_2'$ and $t_3'$, the deviation amount $\Delta z_1$ of the scanning start-side opening 21 in the center optical axis direction and the deviation amount $\Delta z_3$ of the scanning end-side opening 23 in the center optical axis direction are determined.

The following describes how to determine the deviation amounts $\Delta z_1$, and $\Delta z_3$ from the values $x(t_1)$, $x(t_2)$, $x(t_3)$, $t_1'$, $t_2'$ and $t_3'$.

First, using a tilt angle $\psi$ of the actual surface of the photoconductor belt 1 to that of the photoconductor belt 1 the position of which is supposed to be ideal, in addition to the values $x(t_1)$, $x(t_2)$, $x(t_3)$, $t_1'$, $t_2'$ and $t_3'$, the deviation amounts $\Delta z_1$ and $\Delta z_3$ are represented as follows:

$$\Delta z_1 = \{[x(t'_1)-x(t'_2)]-[x(t_1)-x(t_2)]\cos \psi\}\cdot \cot \phi(t'_1) \quad (5)$$

$$\Delta z_3 = \{[x(t'_3)-x(t'_2)]-[x(t_3)-x(t_2)]\cos \psi\}\cdot \cot \phi(t'_3) \quad (6)$$

Then, using $t_1$, $t_3$, $\Delta z_1$, $\Delta z_3$, the tilt angle $\psi$ in equations (5) and (6) can be represented as follows:

$$\Psi = \sin^{-1}\left(\frac{\Delta z_3 - \Delta z_1}{x(t_3) - x(t_1)}\right) \quad (7)$$

Then, first approximate values $\Delta z_1'$ and $\Delta z_3'$ are calculated by setting the tilt angle ψ to zero in equations (5) and (6) (steps S22). The first approximate values $\Delta z_1'$ and $\Delta z_3'$ are substituted in equation (7) to obtain the value ψ. The value ψ obtained is substituted in equations (5) and (6). The successive substitutions are repeated several times, and the values $\Delta z_1$, $\Delta z_3$ and ψ finally obtained are output as calculation results (step S23). However, if ψ' obtained as a result of the calculation using the first approximate values $\Delta z_1'$ and $\Delta z_3'$ is determined to be small enough, the first approximate values $\Delta z_{1'}$, $_{\Delta z3}'$ and the value ψ' are used as calculation results.

Next, using $x(t_1)$, $x(t_2)$, $x(t_3)$, $t_1'$, $t_2'$ and $t_3'$ in addition to the calculated values $\Delta z_1$, $\Delta z_3$, and ψ, the function $\Delta z(t)$ indicative of the deviation amount in the center optical axis direction from the design position of the surface of the photoconductor irradiated at time t is determined (step S24). The function $\Delta z(t)$ is represented as the following equation using $x(t_1)$, $x(t_2)$, $x(t_3)$, $t_1'$, $t_2'$ and $t_3'$ in addition to $\Delta z_1$, $\Delta z_3$ and ψ.

$$\Delta z(t) = \quad (8)$$
$$\frac{\Delta z_3 - \Delta z_1}{[x(t_3) - x(t_1)] \cdot \cos\Psi} \cdot (x(t) - \{x(t_2') + [x(t_1) - x(t_2)] \cdot \cos\Psi\}) + \Delta z_1$$

If ψ is determined to be too small to influence the accuracy of the results, the function $\Delta z(t)$ can be approximated into the following equation using $\Delta z_1'$ and $\Delta z_3'$ in addition to $x(t_1)$, $x(t_2)$, $x(t_3)$, $t_1'$, $t_2'$ and $t_3'$.

$$\Delta z(t) = \frac{\Delta z_3 - \Delta z_1}{x(t_3) - x(t_1)} \cdot (x(t) - \{x(t_2') + [x(t_1) - x(t_2)]\}) + \Delta z_1 \quad (9)$$

Then, the function v'(t) indicative of the actual scanning speed at time t of the laser beam along the surface of the photoconductor belt 1 deviates is determined (step S25).

The following describes how to determine the function v'(t). Suppose that the position of the photoconductor belt 1 deviates from the ideal position. Using as reference a virtual position or such a position that the scanning position becomes zero, represented as a scanning position x'(0), at which the horizontal synchronizing signal is output, the scanning position x'(t) of the laser beam along the surface of the photoconductor belt 1 is represented as the following equation:

$$x'(t) = x(t) - \Delta z(t) \cdot \cot[\phi(t)] - \Delta x \cdot U(t) \quad (10)$$

where, $$U(t) = 0 \; (t \leq 0) \quad (11)$$
$$= 1 \; (t > 0)$$

From equation (10), the function v'(t) indicative of the actual scanning speed at time t of the laser beam along the surface of the photoconductor belt 1 is calculated as shown in equation (12), where δ(t) is a delta function.

$$v'(t) = \frac{d}{dt}x'(t) = \frac{d}{dt}x(t) - \frac{d}{dt}\Delta z(t) \cdot \cot[\phi(t)] - \frac{d}{dt}\Delta x \cdot U(t) \quad (12)$$
$$= v(t) - \frac{d}{dt}\Delta z(t) \cdot \cot[\phi(t)] - \Delta x \cdot \delta(t)$$

However, if t=0, i.e., at the time of occurrence of the horizontal synchronizing signal, the laser beam is beyond the scanning range in which the laser beam is incident on the photoconductor belt 1. Since this makes it impossible to determine the function φ(t) indicative of the incident angle of the laser beam to the photoconductor belt 1, the above equation is unpractical. Therefore, t0 is defined as such a time that the laser beam falls outside the drawing area before reaching there ($0 \leq t0 \leq t_1'$), and that it allows an incident angle φ(0) of the laser beam to the photoconductor belt 1 to be determined. Then, equation (10) is modified as follows:

$$x'(t) = x(t) - \{\Delta z(t_0) \cdot \cot[\phi(t_0)] + \Delta x\} \cdot \frac{t}{t_0} \; (0 \leq t \leq t_0) \quad (13)$$
$$x(t) - \Delta z(t) \cdot \cot[\phi(t)] - \Delta x \; (t \geq t_0)$$

From equation (13), the function v'(t) indicative of the actual scanning speed at time t of the laser beam along the surface of the photoconductor belt 1 is represented as follows:

$$v'(t) = v(t) - \{\Delta z(t_0) \cdot \cot[\phi(t_0)] + \Delta x\} \cdot \frac{1}{t_0} \; (0 \leq t \leq t_0) \quad (14)$$
$$v(t) - \frac{d}{dt}\Delta z(t) \cdot \cot[\phi(t)] \; (t \geq t_0)$$

In other words, the function v'(t) indicative of the actual scanning speed at time t of the laser beam along the surface of the photoconductor belt 1 is calculated from equation (14).

Finally, as in step S8, the clock defining function f'(t) that defines a clock frequency at time t is calculated.

The clock defining function f'(t) can be determined from equations (1), (2) and (14). In other words, the clock defining function f'(t) is represented as the following equation (15) in terms of the distance P between recording pixels in the horizontal scanning direction, the function $\Delta z(t)$ indicative of the deviation amount at time t for the case where the irradiation position of the laser beam onto the surface of the photoconductor deviates in the center optical axis direction from the design position, the function φ(t) indicative of the incident angle of the laser beam to the photoconductor belt 1 at time t.

$$f'(t) = f(t) - \frac{1}{p} \cdot \{\Delta z(t_0) \cdot \cot[\phi(t_0)] + \Delta x\} \cdot \frac{1}{t_0} \; (0 \leq t \leq t_0) \quad (15)$$
$$f(t) - \frac{1}{p} \cdot \left\{\frac{d}{dt}\Delta z(t) \cdot \cot[\phi(t)]\right\} \; (t \geq t_0)$$

Although in the above description the function v'(t) is determined to calculate the function f'(t) from equation (1), the function f'(t) may be calculated directly from equation (15) after step S24.

As described above, in this embodiment, the function ψ(t) indicative of the incident angle of the laser beam to the photoconductor belt 1 at time t for the case where the photoconductor belt 1 is put in the ideal position, the function x(t) indicative of the scanning position of the laser beam on the photoconductor belt 1, and the time intervals $t_1$, $t_2$ and $t_3$ are prestored. Then, Δx, $\Delta z_1$, $\Delta z_3$ and ψ are calculated from the measured time intervals $t_1'$, $t_2'$ and $t_3'$. From the calculated $\Delta x$, $\Delta z_1$, $\Delta z_3$ and $\psi$, the function $\Delta z(t)$ indicative of the deviation amount of the scanning position of the laser beam scanned on the photoconductor belt 1 at time t is determined, and based on the determined $\Delta z(t)$ and the function $\phi(t)$, the clock defining function f(t) predetermined in design is corrected to determine the clock defining function f'(t) at time t.

On one hand, the scanning speed of the laser beam along the photoconductor surface is constant if the photoconductor belt 1 is put in the ideal position. On the other hand, the scanning speed of the laser beam varies over the surface of the photoconductor belt 1 as a whole and even in one scanning operation if the position of the photoconductor belt 1 deviates from the ideal position. Even in the worst case, the pixel clock can be corrected to compensate not only for overall variations in the laser beam scanning speed along the surface of the photoconductor belt 1, but also for variations in the laser beam scanning speed in one scanning operation. This makes it possible to eliminate distortion of an image, and hence, to prevent chromatic aberration of the image.

Further, The scanning start-side opening detector 11, the center opening detector 12, and the scanning end-side opening detectors have a light-receiving area much larger than the scanning start-side opening 21, the center opening 22, and the scanning end-side opening 23, respectively. Therefore, the detectors do not need to be mounted precisely as long as they do not deviate from positions in which the laser beam passes through the openings of the photoconductor belt 1.

Furthermore, if the difference between the time intervals $t_1'$, $t_2'$ and $t_3'$ measured for specific one of four colors and the time intervals $t_1$, $t_2$ and $t_3$ is within an acceptable range, the values $t_1'$, $t_2'$ and $t_3'$ can be considered to be $t_1$, $t_2$ and $t_3$ from which clock defining functions f(t) for the other three colors are determined. If the difference is within the acceptable range, the value P as shown in equation (2) is not absolute and it has only to be relatively consistent among four colors.

Furthermore, if the mechanism shown in FIG. 6 is modified to assure that $\Delta z_1$ is equal to $\Delta z_3$, the center opening detector 12 may be eliminated. Even in this case, $\Delta x$, $\Delta z_1$ and $\Delta z_3$ can be calculated from $t_1$, $t_3$ and $t_1'$, $t_3'$ shown in FIG. 5 without reducing the effect.

Figure 9:
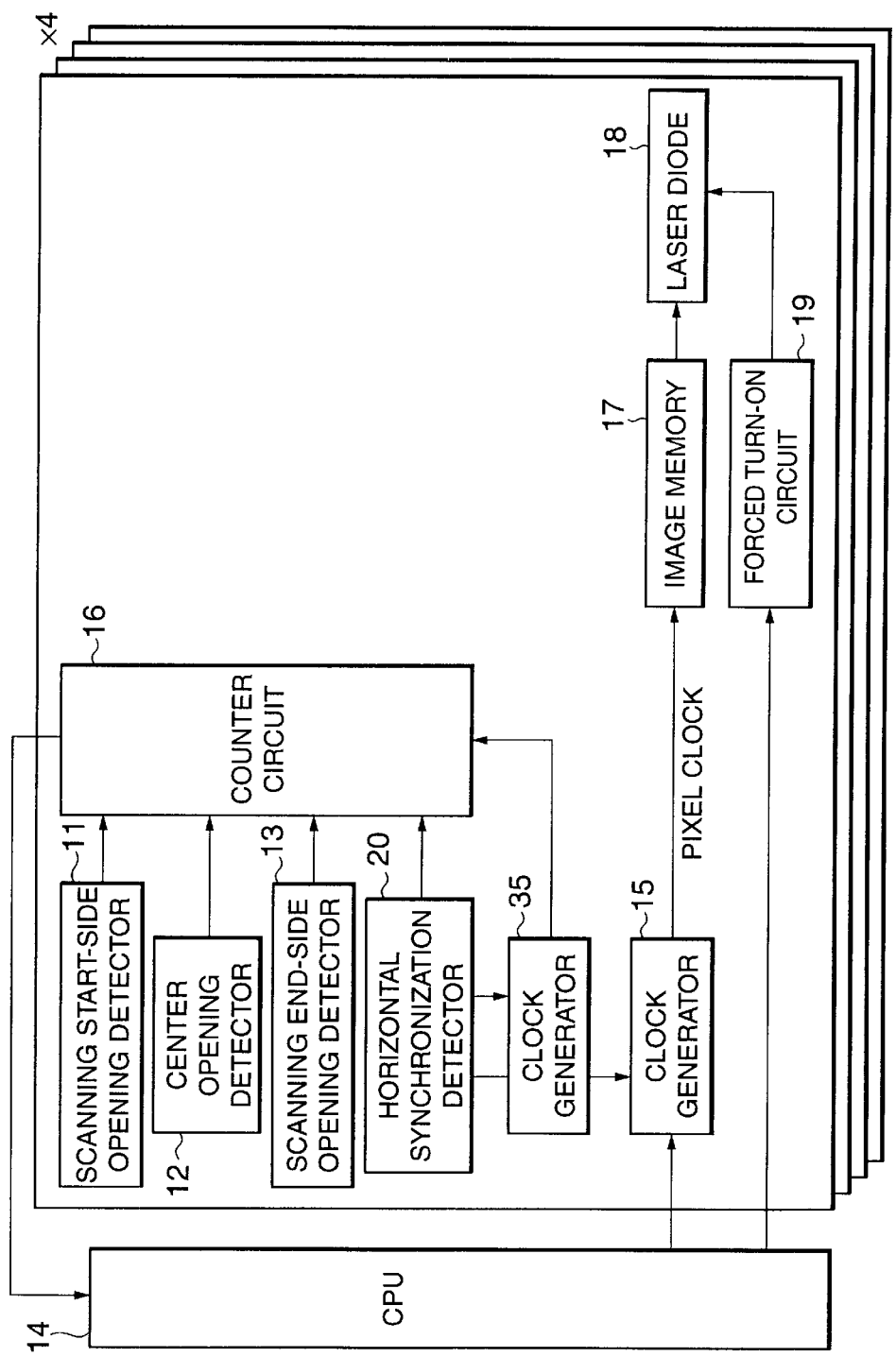
FIG. 9 is a block diagram showing the structure of a second embodiment.
Figure 10:
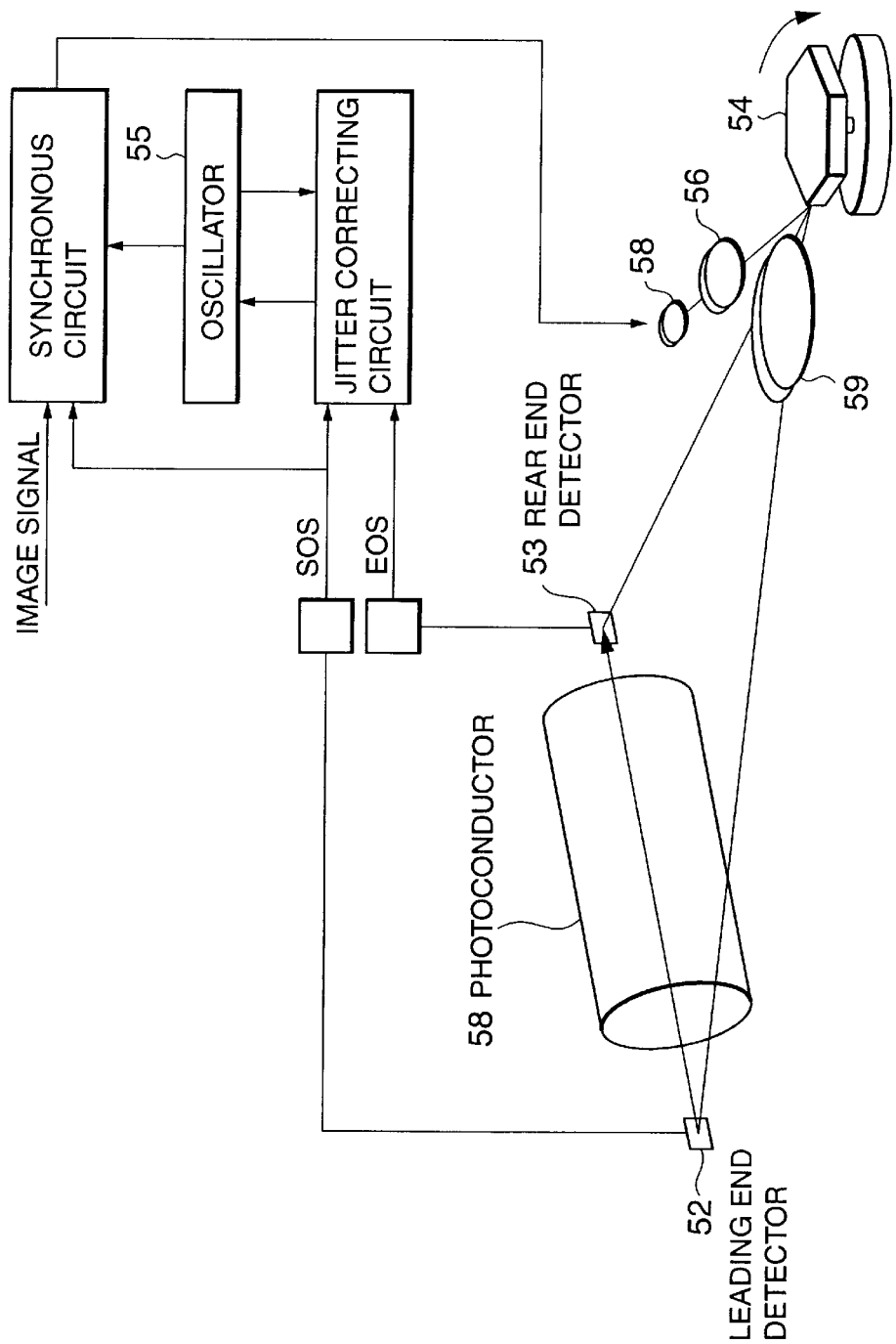
FIG. 10 is a block diagram showing the structure of prior art.

Next, the second embodiment of the present invention will be described. FIG. 9 is a block diagram showing the structure of the second embodiment of the present invention.

As shown, a special clock generator 35 is connected to the counter circuit 16. Output clock frequency of the clock generator 35 is set higher than that of the clock generator 15. For example, it is set double, four times as high as that of the clock generator 15 or more. The higher the output clock frequency, the more precise the measurement of the three time intervals between pulses. As mentioned in the first embodiment, the first time interval is an interval that elapses from the moment the horizontal synchronizing signal pulse is output as a reference from the horizontal synchronization detector 20 until the opening detection pulse is output from the scanning start-side opening detector 11. The second time interval is an interval until the center opening detection pulse is output from the center opening detector 12. The third time interval is an interval until the opening detection pulse is output from the scanning end-side opening detector 13. The second embodiment is to form a latent image of image data in a desired position on the photoconductor belt 1 more precisely.

What is claimed is:

1. A multicolor image forming apparatus comprising:
    a photoconductor;
    a plurality of laser beam scanners for scanning a plurality of laser beams on a surface of said photoconductor to form a plurality of monochromatic images;
    a multicolor image forming means for forming a multicolor image on said surface of said photoconductor by overlapping said plurality of monochromatic images;
    a scanning speed measuring means for measuring scanning speeds of said plurality of laser beams along said surface of said photoconductor;
    image clock-frequency correcting means for correction image clock frequencies for said plurality of laser beams based on said scanning speeds; and
    a plurality of laser beam drivers for driving said plurality of laser beams at said image clock frequencies; wherein
        said photoconductor has a second opening provided near a position in which the laser beam is incident substantially at right angles, a first opening provided on a scanning start side of said second opening, and a third opening provided on a scanning end side of said second opening; and
        said scanning-speed measuring means has a plurality set of first, second and third opening detectors that detect corresponding laser beams passing through the first, second and third openings.

2. A multicolor image forming apparatus according to claim 1, wherein
    each of said laser beam scanners has a horizontal synchronization detector that detects a start of scanning of a corresponding one of said laser beams;
    said scanning-speed measuring means has a plurality of counter circuits, each of said counter circuits counting three time differences in detection times between a corresponding horizontal synchronization detector and said three opening detectors in a corresponding set.

3. A multicolor image forming apparatus according to claim 2, wherein said scanning-speed measuring means comprises a scanning speed calculating means for calculating actual scanning speeds of said plurality of laser beams along said surface of said photoconductor based on corresponding three time differences; and
    image clock-frequency correcting means that corrects said image clock frequencies to compensate for difference between said actual scanning speeds and scanning speeds as intended in design based on said actual scanning speeds.

4. A multicolor image forming apparatus according to claim 3, wherein:
    said image clock frequency are defined as a clock defining function in terms of time intervals as parameters from horizontal synchronizing signals output from said horizontal synchronization detectors; and
    said image clock generator generates a corrected clock defining function that is corrected from a clock defining function as intended in design.

5. A multicolor image forming apparatus according to claim 3, wherein when said three time differences are far from corresponding three reference values, said scanning speed calculating means calculates a clock defining function.

6. A multicolor image forming apparatus according to claim 2, wherein said scanning speed calculating means further includes a plurality of counting clock generators, each of said counting clock generators outputting a counting clock that is used by said counter circuit as a reference to count said three time differences between said horizontal synchronizing detector and said three opening detectors, a frequency of said counting clock being higher than that of said image clock generator.

7. A multicolor image forming apparatus according to claim 2, wherein said scanning speed calculating means comprises a positional deviation calculating means for calculating, from said three time differences, a positional deviation of an actual surface from a surface of said photoconductor put as intended in design relative to each of said laser beam scanners.

8. A multicolor image forming apparatus according to claim 7, wherein said positional deviation calculating means calculates, from said three time differences, a deviation of an actual position from a design position of said second opening in a scanning direction, a deviation of an actual position from a design position of said first opening in a center optical axis direction, and a deviation of an actual position from a design position of a third opening in said center optical axis direction.

9. A multicolor image forming apparatus according to claim 8, wherein said scanning speed calculating means prestores a first function and a second function for the case where said photoconductor is in the design position relative to each of said laser beam scanners, said first function being indicative of incident angles of said laser beam to said photoconductorput with time intervals as parameters, said second function being indicative of scanning positions of said laser beam on said photoconductor with time intervals as parameters, and said scanning speed calculating means calculates a scanning speed of each laser beam along said surface of said photoconductor based on said three deviations, and said first and second functions.

10. A multicolor image forming method for forming a multicolor image by overlapping a plurality of monochromatic images one upon another, said plurality of monochromatic images being obtained by scanning a plurality of laser beams on a surface of photoconductor, comprising the steps of:

measuring a scanning speed of each laser beam alone said surface of said photoconductor;

correcting an image clock frequency based on a measured scanning speed: and driving each laser beam at a corrected image clock frequency; wherein said photoconductor has a second opening provided near a position in which the laser beam is incident substantially at right angles, a first opening provided on a scanning start side of said second opening, and a third opening provided on a scanning end side of said second opening, and the step of measuring a scanning speed of each laser beam along said surface of said photoconductor comprises the steps of detecting the laser beam passing through first, second and third openings provided for each of said laser beam scanners.

11. A multicolor image forming method according to claim 10, wherein the step of calculating said scanning speed of said laser beam along said surface of said photoconductor comprises the step of calculating a positional deviation of an actual surface from a surface of said photoconductor put as intended in design relative to each of said laser beam scanners.

12. A multicolor image forming method according to claim 10, wherein the step of calculating said scanning speed of said laser beam along said surface of said photoconductor comprises the step of:

calculating, from said three time differences, a deviation of an actual position from a design position of said second opening in a scanning direction, a deviation of an actual position from a design position of said first opening in a center optical axis direction, and a deviation of an actual position from a design position of a third opening in said center optical axis direction; and calculating said scanning speed of said laser beam along said surface of said photoconductor based on said three deviations.

13. A multicolor image method according to claim 12, wherein the step of calculating said scanning speed of said laser beam along said surface of said photoconductor comprises the step of:

prestoring a first function and a second function for the case where said photoconductor is in the design position relative to each of said laser beam scanners, said first function being indicative of incident angles of said laser beam to said photoconductorput with time intervals as parameters, said second function being indicative of scanning positions of said laser beam on said photoconductor with time intervals as parameters; and calculating said scanning speed of said laser beam along said surface of said photoconductor based on said three deviations, and said first and second functions.

14. A multicolor image forming method for forming a multicolor image by overlapping a plurality of monochromatic images one upon another, said plurality of monochromatic images being obtained by scanning a plurality of laser beams on a surface of photoconductor, comprising the steps of:

measuring a scanning speed of each laser beam along said surface of said photo conductor;

correcting an image clock frequency based on a measured scanning speed; and driving each laser beam at a corrected image clock frequency;

wherein the step of measuring a scanning speed of each laser beam along said surface of said photoconductor comprises the steps of:

counting three time differences in detection time between a start of scanning of said laser beam and corresponding detection of said three openings;

calculating said scanning speed of said laser beam along said surface of said photoconductor based on said three time differences; and determining a clock frequency to compensate for difference between a calculated scanning speed and a scanning speed as intended in design.

* * * * *